United States Patent [19]
Greenfield et al.

[11] Patent Number: 5,410,655
[45] Date of Patent: Apr. 25, 1995

[54] INTERSYSTEM CHANNEL PAGING SYSTEM HAVING A CIRCUIT FOR EXECUTING SYNCHRONOUS OR ASYNCHRONOUS INSTRUCTIONS FOR TRANSFERRING MESSAGES BETWEEN DEVICES AND A SHARED STORAGE

[75] Inventors: James D. Greenfield, Binghamton; Matthew J. Mitchell, Jr., Endicott, both of N.Y.; William R. Taylor, Rochester, Minn.

[73] Assignee: International Business Machines Corporation, Armonk, N.Y.

[21] Appl. No.: 305,502

[22] Filed: Sep. 13, 1994

Related U.S. Application Data

[63] Continuation of Ser. No. 940,606, Sep. 4, 1992, abandoned.

[51] Int. Cl.⁶ .......................... G06F 3/00; G06F 13/12
[52] U.S. Cl. .................... 395/275; 395/200; 395/425; 364/238.3; 364/239.7; 364/239; 364/228.5
[58] Field of Search .......... 395/200, 400, 275

[56] References Cited

U.S. PATENT DOCUMENTS

| | | | |
|---|---|---|---|
| 4,177,513 | 12/1979 | Hoffman et al. | 364/200 |
| 4,402,046 | 8/1983 | Cox et al. | 364/200 |
| 4,512,016 | 8/1985 | Fulcomer, Jr. et al. | 370/110.1 |
| 4,665,483 | 5/1987 | Ciacci et al. | 364/200 |
| 4,777,595 | 10/1988 | Strecker et al. | 364/200 |
| 4,881,164 | 11/1989 | Hailpern et al. | 364/200 |
| 5,077,655 | 12/1991 | Jinzaki | 395/200 |
| 5,123,101 | 6/1992 | Sindhu | 395/400 |
| 5,214,759 | 5/1993 | Yamaoka et al. | 395/200 |
| 5,218,684 | 6/1993 | Hayes et al. | 395/400 |

OTHER PUBLICATIONS

IBM Technical Disclosure Bulletin, vol. 24, No. 9, Feb. 1982, Queueing Sort, by E. W. Emerick and J. H. Kardock, pp. 4452–4453.

IBM Technical Disclosure Bulletin, vol. 23, No. 5, Oct. 1980. Descriptor Access Exceptions, R. L. Hoffman et al, pp. 2057–2061.

Primary Examiner—Thomas C. Lee
Assistant Examiner—Marc K. Weinstein
Attorney, Agent, or Firm—Baker, Maxham, Jester & Meador

[57] ABSTRACT

An apparatus for intersystem I/O channel paging. The I/O channel through an I/O channel adapter provides communication between a central processor, an I/O processor, and a shared electronic storage device. The central processor and I/O processor are each enabled for recognizing specific instructions. The intersystem channel may be implemented in the form of a page chain table. Either process is capable of constructing a page chain table in the shared electronic storage device, upon receipt of appropriate instructions. The central processor or I/O processor signals the I/O channel adapter with identification of a page chain table to select. The I/O channel adapter fetches table entries and executes the table. The I/O channel adapter initiates I/O activity upon execution of the table. The I/O channel is not dependent upon the central processor or I/O processor for fetching or executing instructions, rather it acts independent of the processors once the page chain table is created. Flags set in the table serve as a disconnection mechanism for the I/O channel paging system. The I/O channel paging mechanism may operate synchronously or asynchronously.

13 Claims, 10 Drawing Sheets

| FIRST PAGE CHAIN WORD 204 | PAGE OUT FIELD 279 |
|---|---|
| | DISC FIELD 280 |
| | LCD FIELD 281 |
| | MCB FIELD 282 |

| SECOND PAGE CHAIN WORD 206 | PAGE IN FIELD 283 |
|---|---|
| | DISC FIELD 284 |
| | LCD FIELD 285 |
| | DATA FIELD 286 |

| THIRD PAGE CHAIN WORD 208 | PAGE IN FIELD 287 |
|---|---|
| | EOC FIELD 288 |
| | LCD FIELD 888 |
| | MRB FIELD 289 |

INTERSYSTEM CHANNEL PAGING SYSTEM HAVING A CIRCUIT FOR EXECUTING SYNCHRONOUS OR ASYNCHRONOUS INSTRUCTIONS FOR TRANSFERRING MESSAGES BETWEEN DEVICES AND A SHARED STORAGE

This application is a file wrapper continuation of U.S. application Ser. No. 07/940,606, filed Sep. 4, 1992, now abandoned.

BACKGROUND OF THE INVENTION

1. Field of the Invention

This invention relates generally to data processing system architectures, and more specifically to an apparatus for intersystem I/O channel paging.

2. Description of the Prior Art

Various approaches have been employed to provide data communications between I/O processors and computer system multiprocessor networks. For example, one prior art approach to multiprocessor data communications architecture uses a shared bus configuration. The shared bus is often employed in conjunction with shared memory, control block conventions, ID's, and/or locks to provide orderly communications and data integrity. However, this approach does not provide a comprehensive system I/O channel mechanism.

Various data communications architectures have been developed in the field of telephone station signalling. One such system uses databit encoding protocols as message sets, which are then conveyed within the structure of existing communications line protocols. However, it should be noted that systems which provide for data communications over standard telephone lines are not generally adaptable in the context of a multiprocessor-I/O device operational environment. These telephonic communications systems lack the data structures and hardware which are required to implement communications between a plurality of I/O devices and various multiprocessors.

Data processing system architectures have been developed which include a central processing unit (CPU), and a plurality of independent I/O processors. The I/O processors are connected in parallel through a bus to provide access to a common working memory. The I/O processors access specified areas of the working memory under the control of a memory access control unit. A set of tridirectional gates connects the working memory to the CPU and to the I/O processors. These systems use a mailbox function to send messages between the CPU and the I/O processors. When the CPU sends instructions to a particular I/O processor, the appropriate message is loaded into an electronic mailbox by means of memory read operations. This system provides for the transfer of relatively basic message structures which include a channel number corresponding to a given I/O processor, and a function code corresponding to a particular operation.

Communications mechanisms for use in multiprocessor systems often operate in the context of a single, shared memory. For example, a commonly-utilized technique involves the sharing and allocation of main memory cycles accessed by I/O devices. These systems may employ a data structure known as a local communications segment. Each communications segment is associated with a specific processor, and the segment is stored in memory. The segment is used for processor-specific communications. Each segment contains a field allocated to control flags. The control flags are set by one processor and later inspected by the same and/or other processors. Based upon the state of the control flag, one or more functions or operational sequences may be performed.

Processor controlled digital communications devices may be employed to accept message commands from a communications system as part of a communications system protocol. These message commands are stripped from the protocol and then combined within the communications device to control signaling sequences at the communications device. Multibit time-separated information fields are used in conjunction with a single bit signaling field. The signaling field bits are compiled over several frames to form various command messages. However, these prior-art digital communications devices are not capable of initiating I/O instructions and actions.

Another commonly-utilized approach to I/O channel communications employs a task handler to initiate and coordinate I/O instructions and actions. Although a few of these task handler systems offer a function called "Send Message", this function serves the limited purpose of enqueueing a task to be executed. These prior-art "Send Message" functions are not capable of initiating I/O instructions and actions.

What is needed is an improved I/O channel system capable of initiating I/O instructions and actions. The approach should provide a comprehensive system I/O channel mechanism which is not dependent upon the use of a shared data bus. The system should include sufficient hardware and data structures to enable operation in the context of a network comprised of I/O devices and one or more multiprocessors.

SUMMARY OF THE INVENTION

The invention provides an improved intersystem channel paging mechanism for an I/O channel. The I/O channel provides communication between a processor complex and a shared electronic storage device. Instruction parameters are forwarded from the processor complex to the shared electronic storage device, and are used to specify the information that must be passed between the processor complex and the shared electronic storage device.

A "send message" instruction is employed in conjunction with the mechanism of the invention. Issuance of a send message instruction results in the transfer of at least one of a control block, data, and a message response block. The send message instruction can be specified either as a synchronous or an asynchronous instruction. When executed synchronously, a central processor waits until the send message operation is completed. If asynchronous operation is specified, the central processor passes the initiative to the I/O processor. The central processor instruction stream proceeds while the I/O processor controls the send message operation.

A preferred embodiment of the invention implements the intersystem channel in the form of a page chain table. The central processor and the I/O processors each contain means for recognizing specific instructions. Upon recognition of an instruction, the processor constructs a page chain table control block in a hardware system area of storage. Once the page chain table is constructed, the processor sends a notification signal to an intersystem channel. In response to the receipt of a notification signal, the intersystem channel fetches one or more page chain table entries, termed page chain table words. The intersystem channel then commences execution of the table, one word at a time.

The page chain table embodiment of the invention may advantageously employ one or more chaining flags. These flags implement a disconnection function between page table entries if the wait period is expected to be of relatively long duration. This disconnection mechanism permits the orderly sharing of execution logic. Furthermore, the disconnection feature provides a channel path that can accept more than one instruction. For example, the channel path is equipped to accept a plurality of send message instructions.

An alternate embodiment of the invention uses the send message instruction to secure the cooperation of the central processor and the I/O processor. At least one of these processors is called upon to execute page-in and page-out functions. At the appropriate times, these functions cause a paging in or a paging out, respectively, of the control block, the data, and the message response block. However, this approach consumes central and I/O processor overhead.

Another alternate embodiment of the invention uses the send message instruction in conjunction with an all-hardware sequencer. The sequencer accepts and directly executes the parameters used by the send message instruction. Such an all-hardware implementation requires the use of multiple state machines combined with relatively complex control logic.

BRIEF DESCRIPTION OF THE DRAWINGS

The various features, aspects, and advantages of the present invention will become apparent from the following more particular description thereof, presented in conjunction with the following drawings.

DETAILED DESCRIPTION OF THE PREFERRED EMBODIMENTS

Figure 1:
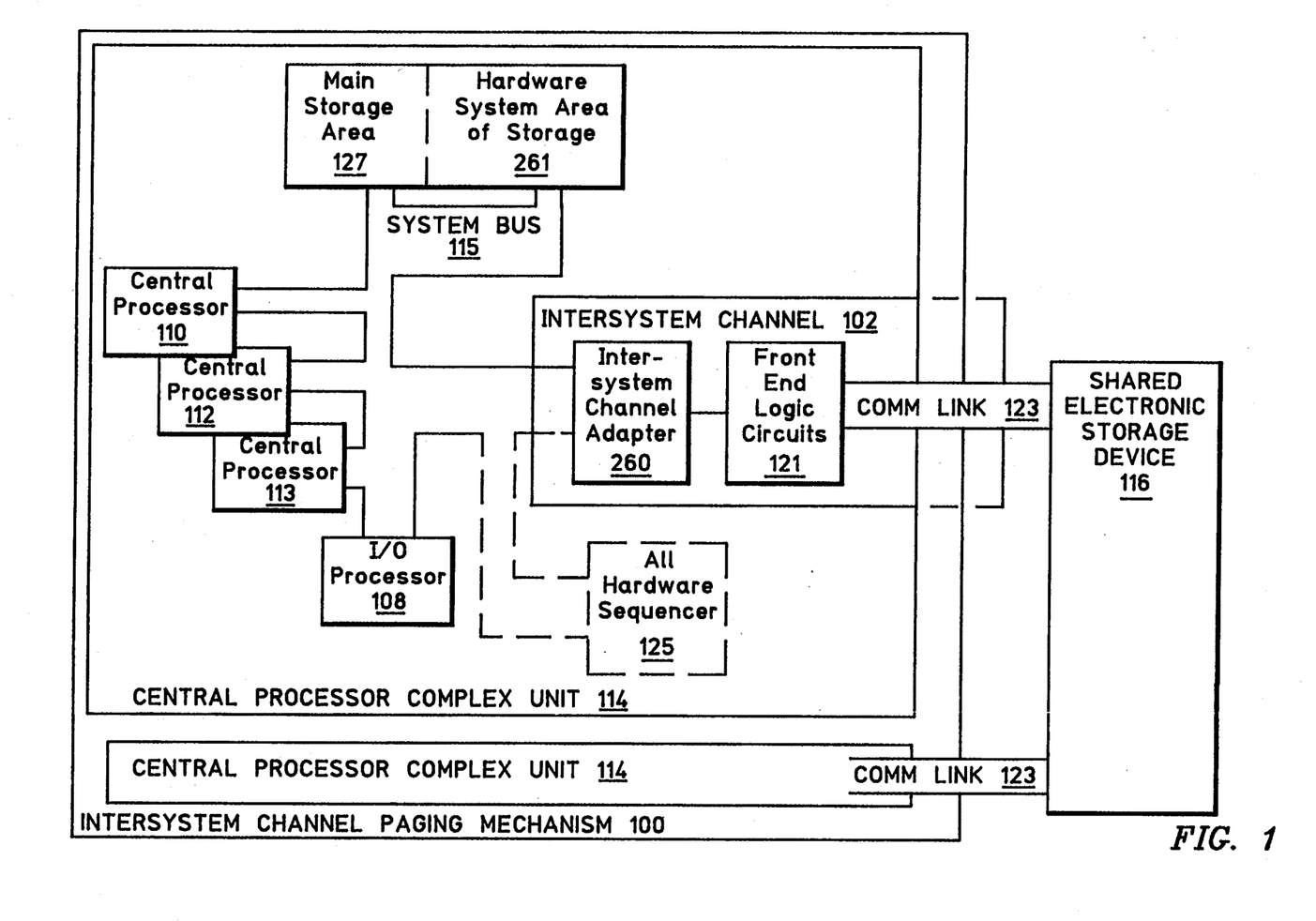
FIG. 1 is a pictorial representation of the basic operational environment of the present invention.

FIG. 1 is a pictorial representation of the basic operational environment of the present invention. The invention provides an improved intersystem channel paging mechanism 100 for an I/O channel. The intersystem channel paging mechanism 100 includes one or more central processor complex units 114. The central processor complex units 114 are connected to a commonly shared electronic storage device 116.

Each central processor complex unit 114 contains plurality of I/O devices for inputting and outputting data, such as an intersystem channel adapter 260, and a hardware system area of storage 261. In addition to the hardware system area of storage 261, a main storage area 127 is also provided. Associated with each central processor complex unit 114 is an I/O processor 108 for processing data by receiving and executing instructions. Also included are a plurality of central processors 110, 112, 113 for processing data by receiving and executing instructions. The main storage area 127, hardware system area of storage 261, central processors 110, 112, 113, and I/O processor 108 are all connected to a system bus 115.

The communications path between the shared electronic storage device and the intersystem channel paging mechanism 100 is referred to as an intersystem channel 102. The intersystem channel 102 includes the intersystem channel adapter 260, front end logic circuits 121, and a communications link 123. The intersystem channel adapter 260 interfaces the system bus 115 with the front end logic circuits 121. In turn, the front end logic circuits are equipped to transmit and/or receive over the communications link 123. The communications link 123 is connected directly to the shared electronic storage device 116. The shared electronic storage device 116 is shared among the various central processor complex units 114 that are interconnected to form the intersystem channel paging mechanism 100. In this manner, the intersystem channel paging mechanism 100 communicates with the shared electronic storage device 116 over the intersystem channel 102.

The intersystem channel 102 of the present invention conveys one or more messages which include at least one of a control block for controlling the transfer of data, a data block, and a message response block for providing an indication of the transfer of data. The message includes a message transfer specification in the form of an instruction which specifies the parameters required to transfer a message between the central processor complex unit 114 and the shared electronic storage device 116. The communications link 123 provides a path to enable the shared electronic storage device 116 to communicate with the main storage area 127. The communications link 123 may be in the form of, for example, a fiber-optic serial data link.

A "send message" instruction is employed in conjunction with the intersystem channel paging mechanism 100 of the invention. The instruction parameters are forwarded from the central processor complex unit 114 to the shared electronic storage device 116, and are used to specify the information that must be passed between the central processor complex unit 114 and the shared electronic storage device 116. Issuance of a send message instruction results in the transfer of at least one of a control block, data, and a message response block. These data structures will be described hereinafter with reference to FIG. 2.

Returning now to FIG. 1, the send message instruction can be specified either as a synchronous or an asynchronous instruction. When executed synchronously, a central processor 110 which may be contained within the central processor complex unit 114 waits until the send message operation is completed. If asynchronous operation is specified, the central processor 110 passes the initiative to the I/O processor 108. The central processor 110 instruction stream proceeds while the I/O processor 108 controls the send message operation.

One possible approach to using the send message instruction requires the cooperation of the central processor 110 and the I/O processor 108 to execute page-in and page-out functions. At the appropriate times, these functions cause a paging in or a paging out, respectively, of the control block, the data, and the message response block. This approach represents a design tradeoff, because it consumes central processor 110 and I/O processor 108 overhead which could be utilized more efficiently to perform other tasks.

Another possible technique for using the send message instruction employs an all-hardware sequencer 125. The sequencer accepts and directly executes the parameters used by the send message instruction. The sequencer 125 is connected to the system bus 115. Such an all-hardware implementation requires the use of multiple state machines in conjunction with relatively complex control logic. Such logic would be susceptible to evolving changes. Furthermore, the logic would provide rather limited flexibility in permitting architectural or functional enhancements.

A preferred embodiment of the invention implements the intersystem channel paging mechanism 100 by using one or more page chain tables. The structure of these page chain tables will be discussed hereinafter with reference to FIG. 2. Referring now to FIG. 1, the central processor 110 and the I/O processor 108 each contain means for recognizing a send message instruction. Upon recognition of the send message instruction, the I/O processor 108 and/or the central processor 110 construct a page chain table control block in the hardware system area of storage 261. Once the page chain table is constructed, the I/O processor 108 and/or the central processor 110 sends a notification signal to the intersystem channel adapter 260. In response to the receipt of a notification signal, the intersystem channel 102 fetches one or more page chain table entries, termed page chain table words. The intersystem channel adapter 260 then commences execution of the table, one word at a time.

The page chain table embodiment of the invention may advantageously employ one or more chaining flags. These flags implement a disconnection function between page table entries if the wait period is expected to be of relatively long duration. This disconnection mechanism permits the orderly sharing of execution logic. Furthermore, the disconnection feature provides an intersystem channel 102 path that can simultaneously accept more than one send message instruction.

Figure 2:
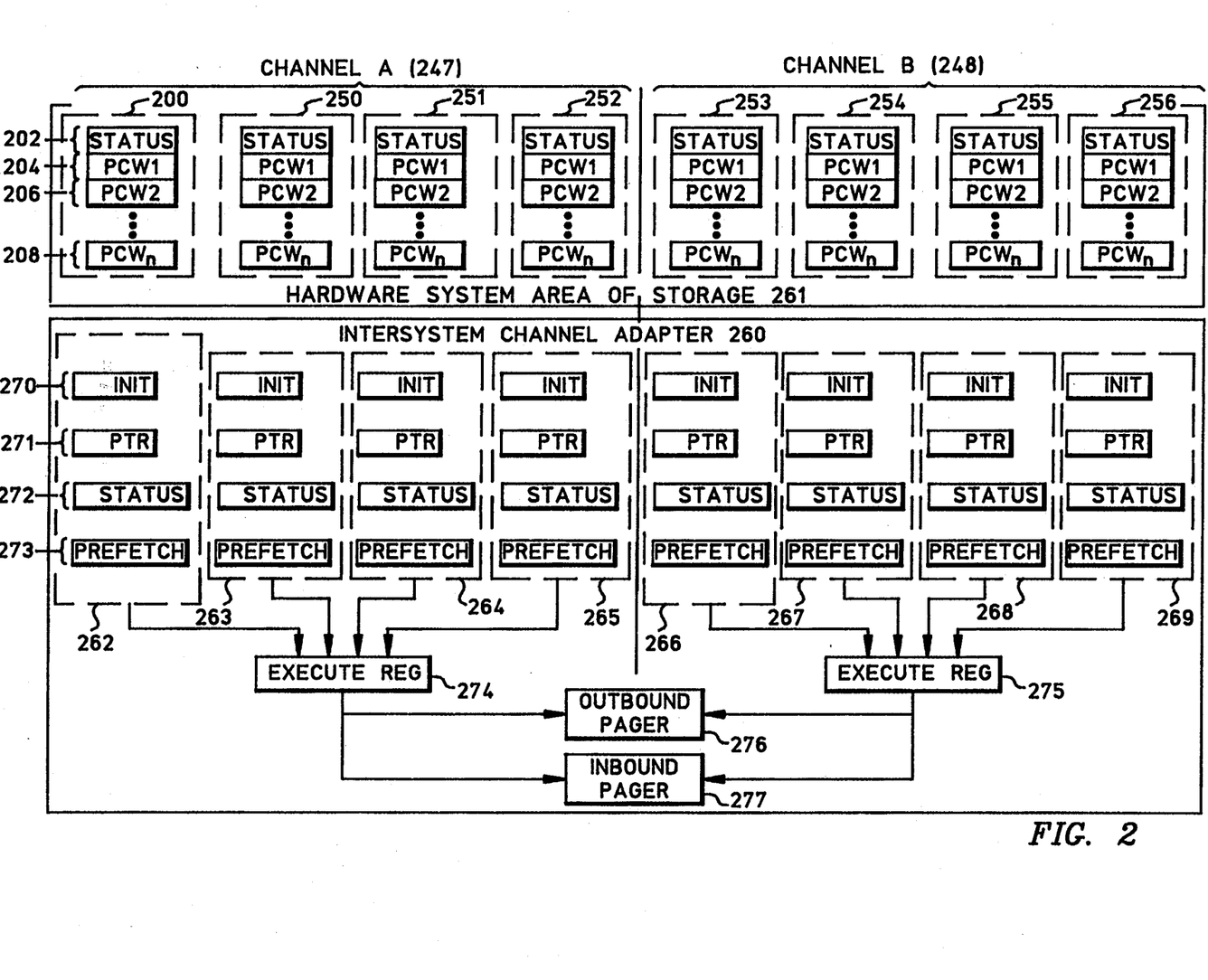
FIG. 2 is a block diagram illustrating the data structure for the page chain table of the present invention.

FIG. 2 is a block diagram illustrating data structures for the page chain tables 200, 250, 251, 252, 253, 254, 255, 256 and the intersystem channel adapter 260 of the present invention. The data structures of FIG. 2 correspond to a paging mechanism having two channels, channel A (reference 247) and channel B (reference 248). Each channel includes one or more paging chain tables. For example, channel A (247) contains paging chain tables 200, 250, 251, and 252. Channel B (248) contains paging chain tables 253, 254, 255, 256. These paging tables are stored in a hardware system area of storage 261.

Each page chain table, such as page chain table 200, contains a first quadword 202 of 16 bytes in length which is used to hold the execution status. When the send message instruction terminates, the results are stored in the quadword 202 for examination and/or action by the central processor 110 (FIG. 1) and/or the I/O processor 108 (FIG. 1). It should be noted that the present invention is not dependent upon the utilization of specific bit assignments. The bit assignments shown in FIG. 2 are for illustrative purposes only.

In addition to the first quadword 202, the page chain table 200 contains one or more additional quadwords. These additional quadwords will hereinafter be referred to as page chain words 204, 206. Note that any number of page chain words 204, 206, from 1 to n, can be accommodated by the intersystem channel paging mechanism 100 (FIG. 1) of the present invention.

Figure 3:
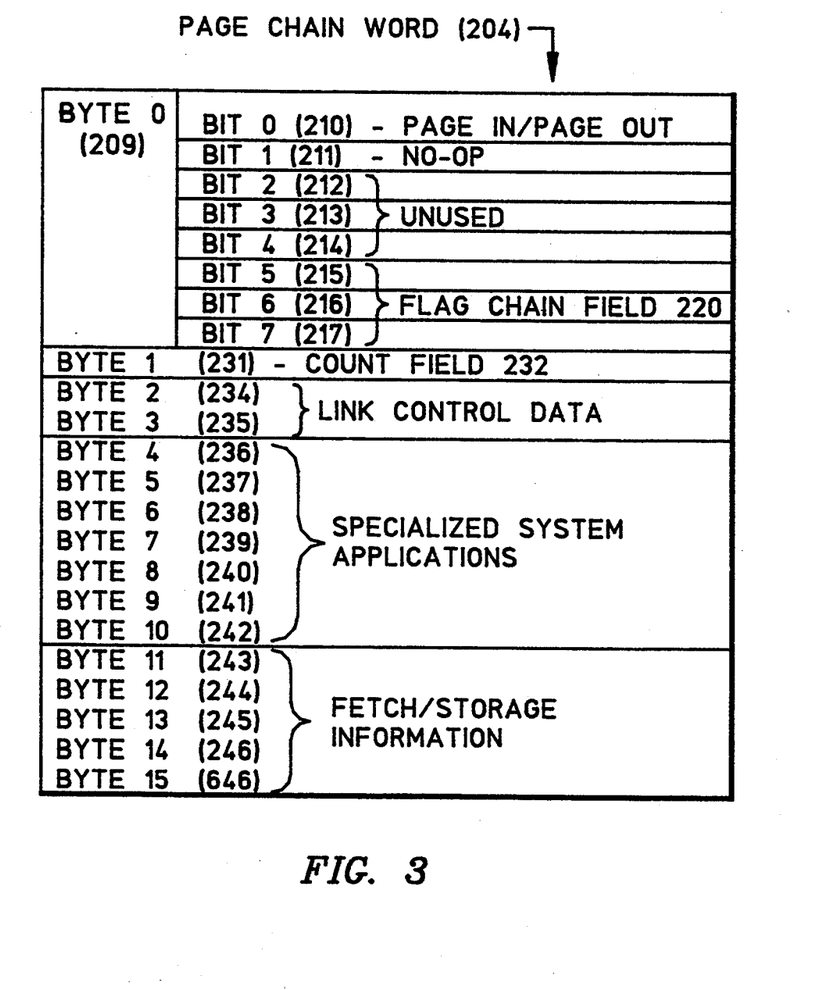
FIG. 3 illustrates the data structures employed to implement the page chain words shown in FIG. 2.

FIG. 3 illustrates the data structure employed to implement the page chain words 204, 206 shown in FIG. 2. With reference to FIG. 3, each page chain word 204 includes 16 bytes. Byte 0 (reference 209) contains eight bits which are allocated as follows. Bit 0 (reference 210) is the page in/page out bit. If Bit 0 (210) has a value of 0, this signifies a page out (write) operation, and if Bit 0 (210) has a value of 1, a page in (read) operation is specified. Bit 1 (211) is the NO-OP bit. If this bit is 1, no data transfer will take place. Bits 2 through 4 (212, 213, and 214, respectively) are not used.

Bits 5 through 7 (215, 216, and 217, respectively) contain the flag chain field 220. This field may contain a value of 001, 010, or 100. A value of 001 signifies a "chain immediate". A "chain immediate" means that the next page chain word 206 will be executed immediately after execution of the present page chain word 204.

A value of 010 for the flag chain field 220 corresponds to a "disconnect". A "disconnect" results in the suspension and disconnection of operations on the page chain table 200 after execution of the present page chain word 204. Operations are disconnected and suspended until a resume signal is received from the shared electronic storage device. Upon the issuance of a resume signal, the paging chain table 200 is reactivated.

A value of 100 for the flag chain field 220 signifies the end of a given chain in the page chain table 200. In other words, the page chain table 200 entry corresponding to a flag chain field 220 value of 100 is the last page chain word in the chain. After execution of the last page chain word, the intersystem channel adapter 260 stores the value of a status register 272 in the first quadword 202 of the associated page chain table 200. The function of the status register 272 will be set forth in more detail hereinafter with reference to the description of the intersystem channel adapter 260. Program control is then passed to the central processor 110 (FIG. 1) and/or the I/O processor 108 (FIG. 1), and the intersystem channel adapter 260 is cleared to indicate that the last chain entry in the page chain table 200 has been executed.

Byte 1 (231) of page chain words 204, 206 contains a count field 232, which indicates the amount of information to be transferred with a given page chain word 204, 206. Bytes 2 and 3 (reference numbers 234, 235, respectively) contain link control data. These data are passed directly through the intersystem channel adapter 260 (FIG. 2) to the front-end logic circuits 121 (FIG. 1) that control the movement of data to and interface with the communications link 123 (FIG. 1). Returning now to FIG. 3, bytes 4 through 10 (reference numbers 236, 237, 238, 239, 240, 241, and 242, respectively) are reserved for various specialized system applications.

Bytes 11 through 15 (reference numbers 243, 244, 245, 246, and 646, respectively) contain fetch and/or storage information. Storage information sets forth the storage address to which the specific information will be stored. Fetch information includes the address from which information will be fetched for transmission.

Referring again to FIG. 2, the data structures employed in conjunction with the intersystem channel adapter 260 will be described. The intersystem channel adapter 260 provides two channel paths, a first path for channel A (247), and a second path for channel B (248). Each channel path includes four operational sets of hardware. For example, channel A (247) includes operational sets of hardware 262, 263, 264, and 265. Channel B contains operational sets of hardware 266, 267, 268, and 269. Therefore, each channel 247, 248 accepts up to four different operations.

Each operational set of hardware has associated with it a page chain table in the hardware system area 261 of storage. For example, operational set of hardware 262 is associated with page chain table 200, and operational set of hardware 263 is associated with page chain table 250. Each operational set of hardware 262, 263, 264, 265, 266, 267, 268, and 269 includes four registers. The first register is termed the init register 270. The init register 270 includes a pointer which points to the beginning of the corresponding page chain table 200 in the hardware system area 261 of storage. The init register 270 is set to a fixed value at the time the intersystem channel adapter 260 is initialized.

The second register contained by the operational sets of hardware 262, 263, 264, 265, 266, 267, 268, 269 is termed the ptr register 271. The ptr register 271 contains a pointer to the next page chain word that is to be fetched from the page chain table 200.

The operational sets of hardware 262, 263, 264, 265, 266, 267, 268, 269 include a third register called the status register 272. The status 272 register is a repository for normal (or any abnormal) conditions that might have occured during the execution of the page chain words 204 (FIG. 3) in the page chain tables 200, 250, 251, 252, 253, 254, 255, and 256 (FIG. 2). The value of the status register 272 may be stored in the first quadword 202 of the associated page chain table 200 after execution of a page chain word containing the end of chain flag. Note that the first quadword 202 is used to indicate the execution status of the page chain table 200. If a given page chain ends prematurely for any reason, i.e., prior to the time that an end of chain flag is present, the value of the status register 272 is immediately placed into the first quadword 202 of the associated page chain table 200.

The fourth register contained by the operational sets of hardware 262, 263, 264, 265, 266, 267, 268, 269 is the prefetch register 273. The prefetch register 273 contains the next page chain word that is a candidate for execution for a given operational set of hardware 262, 263, 264, 265, 266, 267, 268, 269.

The intersystem channel adapter 260 includes a page chain word execute register 274, 275 for each channel 247, 248. Each page chain word execute register 274, 275 is shared among four operational sets of hardware 262, 263, 264, 265, 266, 267, 268, 269. For example, page chain word execute register 274 is shared by operational sets of hardware 262, 263, 264, and 265. Page chain word execute register 275 is shared by operational sets of hardware 266, 267, 268, and 269.

Each operational set of hardware 262, 263, 264, 265, 266, 267, 268, 269 can be engaged in any one of several operational modes. For example, one such operational mode is "EMPTY", which signifies that the intersystem channel adapter 260 is waiting for a central processor 110 (FIG. 1) and/or an I/O processor 108 (FIG. 1) initiative. Another operational mode is "ACTIVE", where the execute register 274 is now "owned" by a given operational set of hardware 262, 263, 264, 265. A third operational mode is "DISCONNECTED", where the intersystem channel adapter 260 is waiting for a response from the shared electronic storage device 116 (FIG. 1). Such a response represents an attempt to reactivate and bid for ownership of a particular execute register 274, 275.

Each of the execute registers 274, 275 contends for a single outbound pager 276, and for a single inbound pager 277. Contention for these inbound and outbound pagers 276, 277 signifies that the execute register 274, 275 operations will be serialized whenever the execute registers 274, 275 are contending for the same pager 276, 277.

Figure 4:
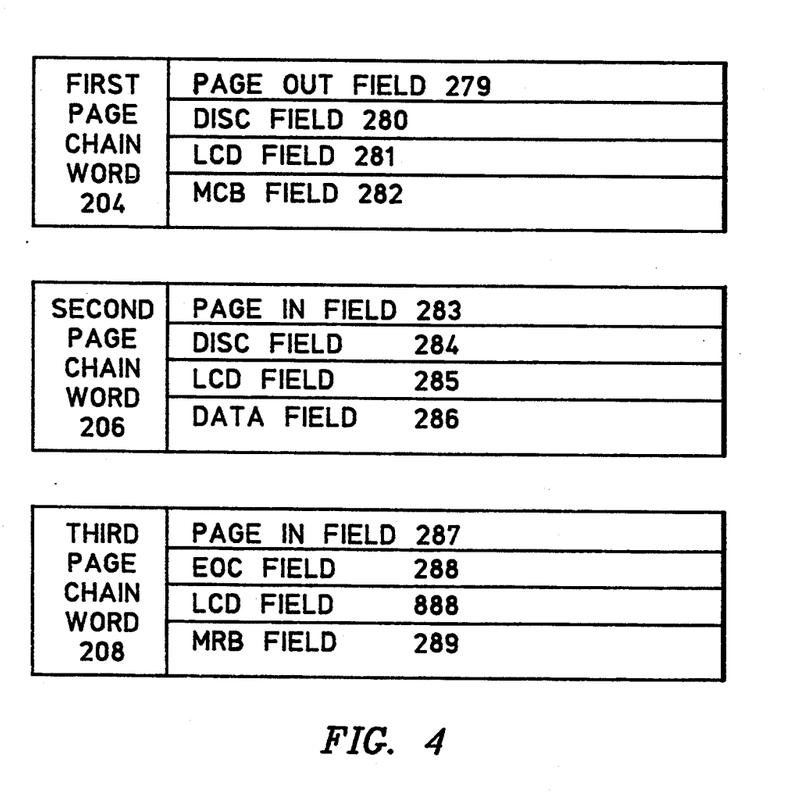
FIG. 4 sets forth the contents of a sequence of page chain words which include a send message read instruction.

The page chain words 204, 206 of FIGS. 2 and 3 may contain various instructions. FIG. 4 sets forth the contents of a sequence of page chain words 204, 206, 208 which include a send message read instruction. Upon issuance of a send message read instruction, preliminary tests are performed, including validity checking, authorization verification, and/or path finding. After these checks are performed, the central processor 110 (FIG. 1) and/or the I/O processor 108 (FIG. 1) constructs page chain words 204, 206, 208 in the selected page chain table 200. These page chain words 204, 206, 208 represent a send message read instruction.

The first page chain word 204 of the send message read instruction includes a "page out" field 279, followed by a DISC (disconnect) field 280, an LCD (link control data) field 281, and an MCB (message control block) field 282 containing the storage address of the MCB. The second page chain word 206 contains a "page in" field 283, followed by a DISC field 284, an LCD field 285, and a DATA field 286 containing the storage address of the data. The third page chain word 208 includes a "page in" field 287, an EOC (end of chain) field 288, an LCD (link control data) field 888, and an MRB (message response block) field 289.

FIGS. 5A–5F are a flowchart setting forth the operational sequences for a send message read instruction. The send message read instruction commences operation at block 501 (FIG. 5A) by the transmission of a notification signal from the central processor 110 (FIG. 1) or the I/O processor 108 to the intersystem channel adapter 260. The notification signal contains an identification code which uniquely specifies a given page chain table 200, 250, 251, 252, 253, 254, 255, or 256 (FIG. 2). At block 503 (FIG. 5A), the operational set of hardware 262, 263, 264, 265, 266, 267, 268, or 269 (FIG. 2) corresponding to the specified page chain table 200, 250, 251, 252, 253, 254, 255, or 256 (FIG. 2) fetches the first page chain word from the page chain table and places it into the page chain word prefetch register 273 (FIG. 2).

Figure 5A:
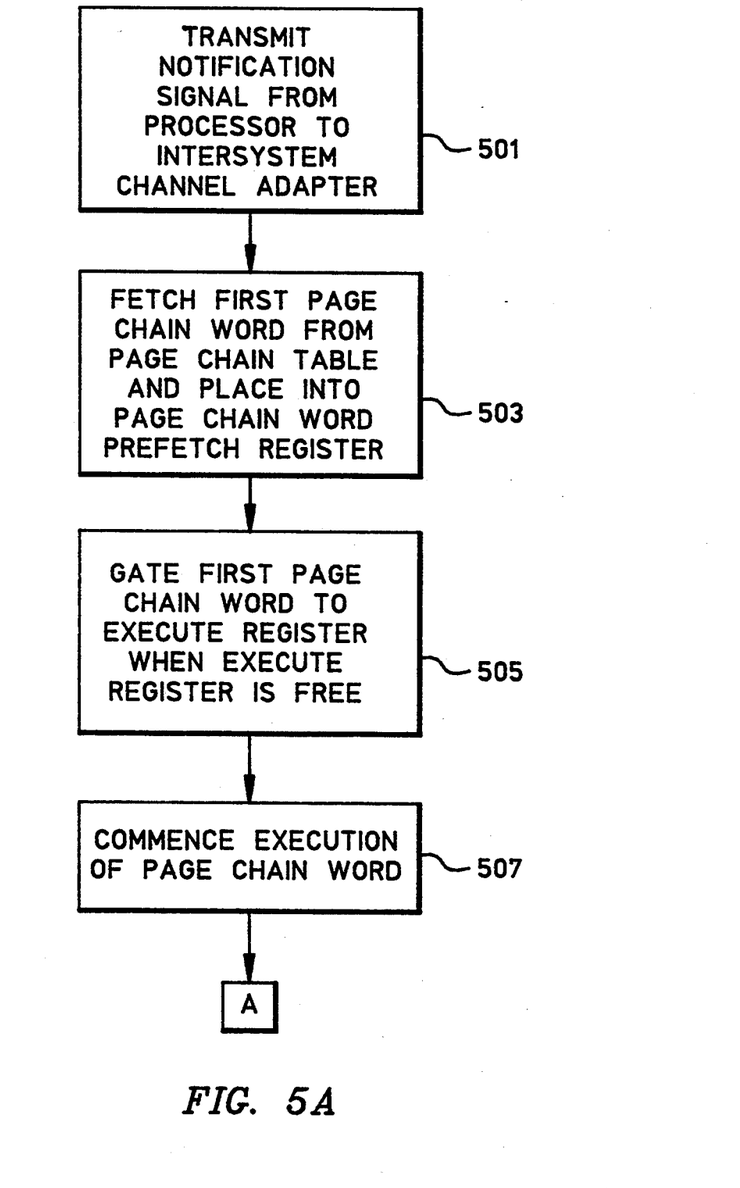
FIGS. 5A-5F are a flowchart setting forth the operational sequences for a send message read instruction.
Figure 5B:
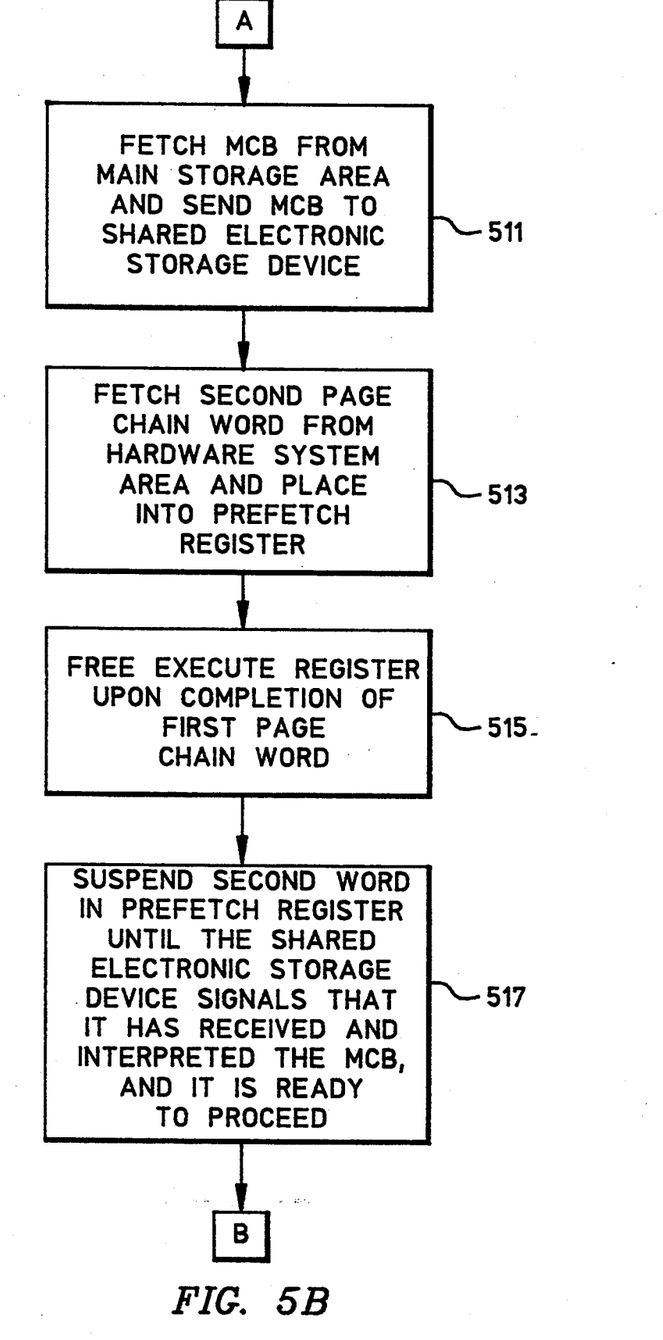

When the page chain word execute register 274, 275 (FIG. 2) is free, the first page chain word is gated to that register at block 505 (FIG. 5A). Execution of the page chain word commences at block 507. The MCB (message control block) 282 (FIG. 4) corresponding to the send message read instruction is fetched from the main storage area 127 and conveyed to the shared electronic storage device 116 (FIG. 1) at block 511 (FIG. 5B). The MCB 282 is conveyed to the shared electronic storage device 116 using front-end logic circuitry 121 (FIG. 1), which may include a fiber optic communications link.

After the first page chain word is transferred to the execute register 274, 275 (FIG. 2), the second page chain word is fetched from the hardware system area of storage 261 (FIG. 2) and placed into the prefetch register 273 (FIG. 2) at block 513 (FIG. 5B). For purposes of the present example, the DISC field 280 (FIG. 4) of the first page chain word contains a value indicating a state of "on". The execute register 274, 275 (FIG. 2) is freed upon completion of the first page chain word at block 515 (FIG. 5B). The second page chain word is suspended in the prefetch register 273 (FIG. 2) until the shared electronic storage device 116 signals that it has received and interpreted the MCB, and it is ready to proceed (FIG. 5B, block 517).

Figure 5C:
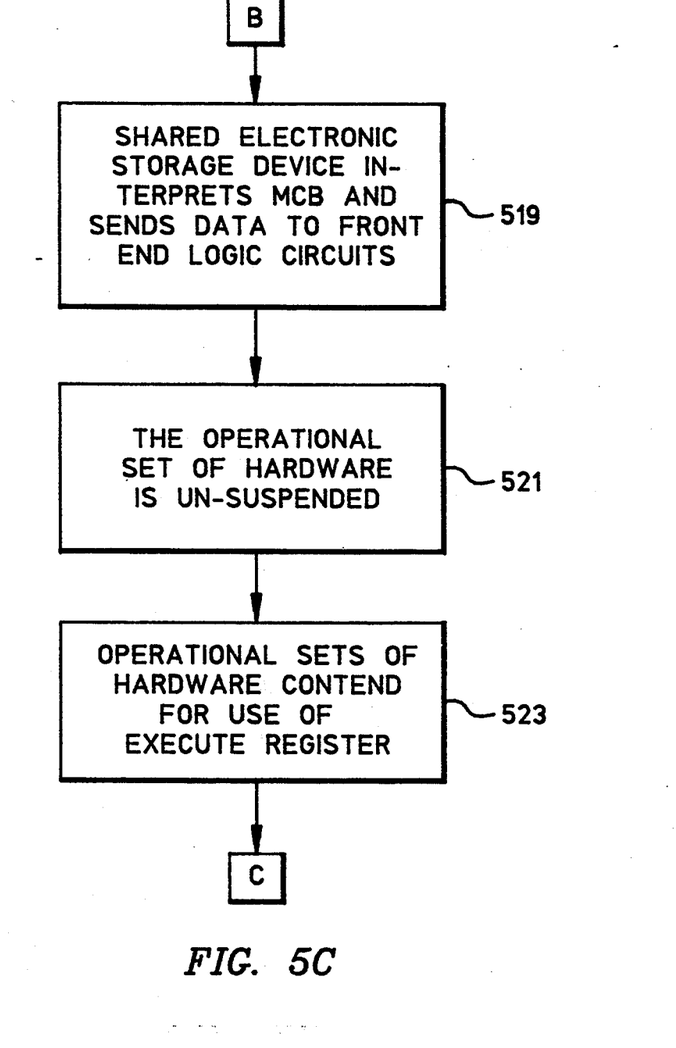

The shared electronic storage device 116 (FIG. 1) sends the data over the communications link 123 to the front-end logic circuitry 121 (FIG. 5C, block 519). At this point, the operational set of hardware 262, 263, 263, 265, 266, 267,268, or 269 (FIG. 2) that initiated the "send message read" is notified that the read data have arrived. This action unsuspends the page chain word in the prefetch register 273 (FIG. 2) at block 521 (FIG. 5C).

At block 523, the operational set of hardware 262, 263, 264, 265, 266, 267, 268, and/or 269 (FIG. 2) corresponding to the specified page chain table 200, 250, 251, 252, 253, 254, 255, or 256 (FIG. 2) contends for the use of the execute register 274 or 275 (FIG. 2). When the bid for the execute register (274 or 275) is successful (block 525, FIG. 5D), the second page chain word 206 (FIG. 4) is executed (block 526), and the data are placed into the specified main storage area 127 (FIG. 1) at block 527 (FIG. 5D).

Figure 5D:
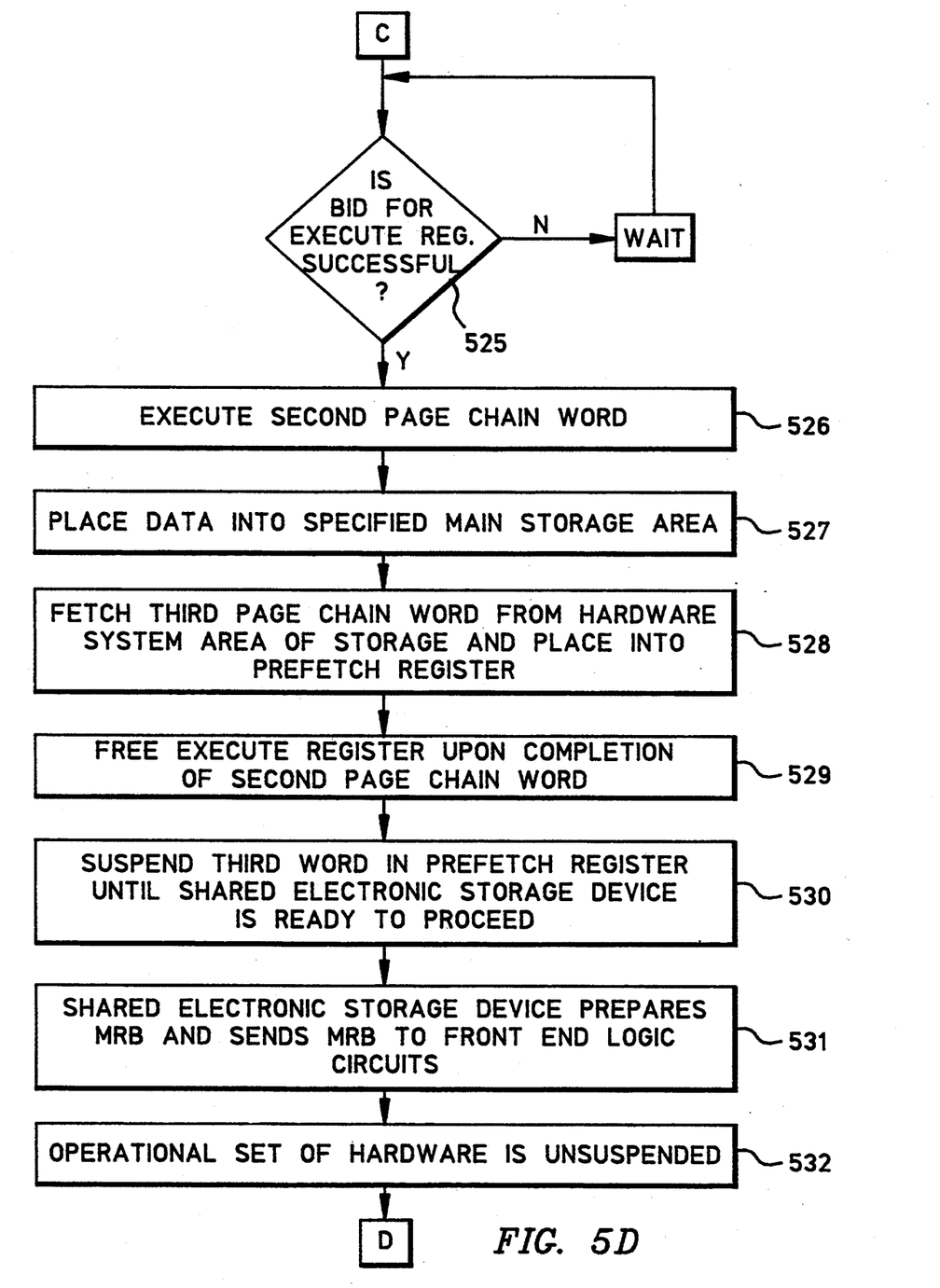
Figure 5E:
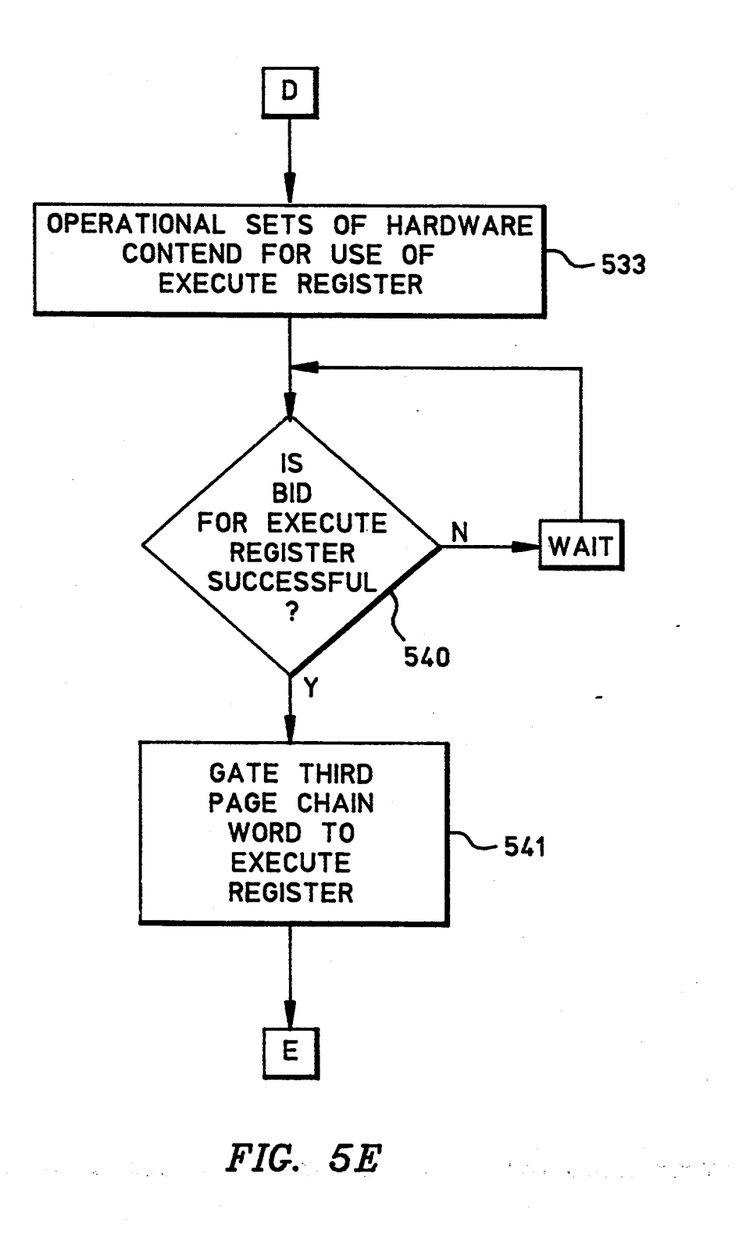

The cycle as described with reference to blocks 513–527 (FIGS. 5A–5D) repeats for the third page chain word 208 (FIG. 4) in block 528 (FIG. 5D). In block 528, the third page chain word is fetched from the hardware system area of storage 261 (FIG. 2) and placed into the prefetch register 273. The cycle will repeat because the second page chain word 206 (FIG. 2) has a DISC field 284 which indicates an "on" state. Hence, once the third page chain word 208 is fetched at block 528 (FIG. 5D), operations are suspended at block 529, pending receipt of the expected MRB field 289 (FIG. 4). Once the second page chain word 206 (FIG. 4) is completed, the execute register 274 or 275 (FIG. 2) is freed (FIG. 5D, block 529).

The third page chain word 208 is suspended in the prefetch register 273 (FIG. 2) until the shared electronic storage device 116 (FIG. 1) is ready to proceed (FIG. 5D, block 530). Once ready to proceed, the shared electronic storage device 116 (FIG. 1) prepares an MRB (message response block) 289 (FIG. 4) and sends the MRB to the front end logic circuits 121 (FIG. 1) at block 531. Next, at block 532, the operational set of hardware 262, 263, 264, 265, 266, 267, 268, and/or 269 (FIG. 2) is unsuspended. At block 533 (FIG. 5E), the operational sets of hardware contend for use of the execute register 274 or 275 (FIG. 2).

Figure 5F:
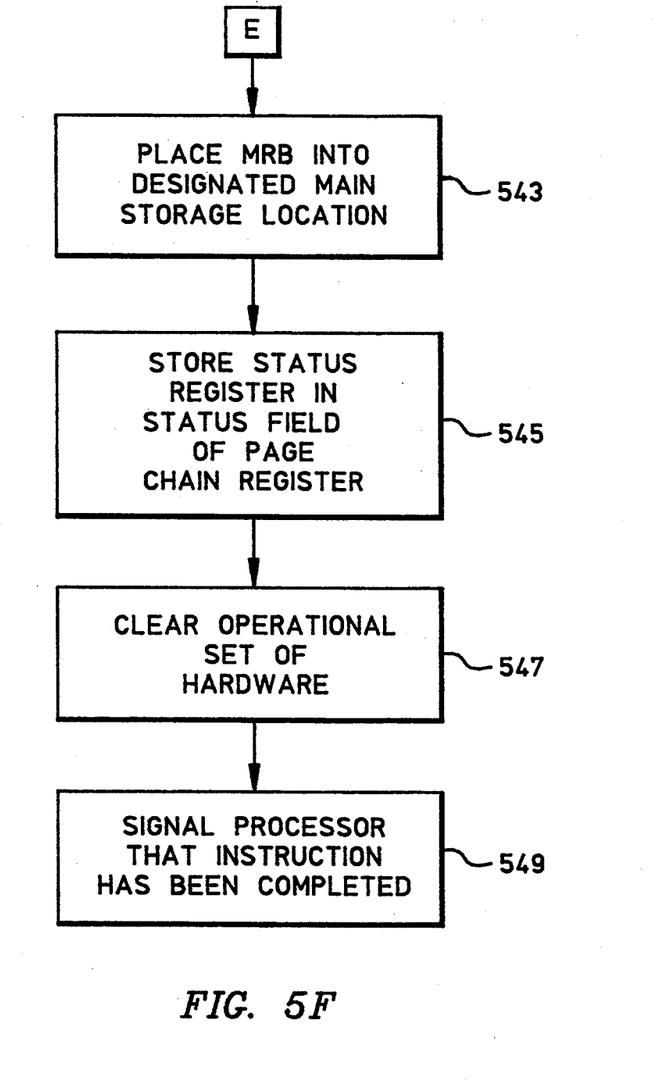

When the bid for the execute register 274 or 275 (FIG. 2) is successful at block 540, the third page chain word 208 (FIG. 4) is gated to the execute register (FIG. 5E, block 541), and the MRB 289 is moved into the designated main storage location (FIG. 5F, block 543). Since the third page chain word 208 has an end of chain (EOC) field 288 (FIG. 4) value of "on", the status register 272 (FIG. 2) is stored in the status field 202 (FIG. 2) of the page chain table (block 545), the operational set of hardware 262, 263, 264, 265, 266, 267, 268, and/or 269 is cleared (block 547), and the central processor 110 (FIG. 1) and/or the I/O processor 108 (FIG. 1) is signaled to indicate that the instruction has completed (block 549).

The operational sequences performed by the send message read instruction as described above in reference to FIGS. 5A–5F are similar to the operational sequences which are performed in the case of a send message write instruction. However, in the case of the send message read instruction, the DISC 280 field of the first page chain word 204 (FIG. 4) is replaced by a CI flag field containing a predetermined value. Upon execution of the first page chain word 204, the predetermined value in the CI flag field causes the prefetched second page chain word 206 (FIG. 2) to move to the page chain word execution register (274 or 275) immediately; no disconnection occurs at this point in time. The second page chain word 206 fetches data from the main storage area 127 (FIG. 1), and it is passed to a communications link 123 (FIG. 1) for transmission to shared electronic storage 116 (FIG. 1). Since the second page chain word 206 (FIG. 4) does have a DISC field 284 value of "on", the remainder of the send message write operation is identical to that of the send message read operation described in FIGS. 5A–5F.

A number of specific embodiments of the present invention have been described. Nevertheless, it will be understood that various modifications and changes may be made without departing from the spirit and scope of the invention. For example, the data structures of FIGS. 2 and 3 represent one preferred embodiment of the intersystem channel paging mechanism. Other variations of these data structures are possible, such as the utilization of more or less operational sets of hardware. Similarly, varying degrees of register and/or pager sharing may be employed. The intersystem paging channel mechanism will handle page chain words that are constructed in sequences other than those described in conjunction with FIGS. 2–4. The only requirement is that both ends of the data link connection agree upon the operational conventions.

We claim:

1. An intersystem channel paging mechanism comprising:
   (a) a plurality of central processor complex units, each said processor complex unit comprising:
      (i) memory means including at least a main memory storage area and a hardware system area of storage;
      (ii) central processor means including at least one central processor for processing data by receiving and executing instructions;
      (iii) a plurality of I/O devices for inputting and outputting data;
      (iv) I/O processor means for processing data by receiving and executing instructions governing said inputting and outputting of data by said pluralily of I/O devices; and
      (v) processor complex communications network means including a system bus connected to said memory means, said central processor means, said plurality of I/O devices, and said I/O processor means;
   (b) shared electronic storage means for storing data, said electronic storage means including sharing means for sharing said electronic storage means among said plurality of central processor complex units and having a plurality of communication ports;
   (c) a message including at least one of a control block for controlling the transfer of data, a data block, and a message response block for providing an indication of the transfer of data;
   (d) intersystem channel means for providing communications between said shared electronic storage means and said plurality of central processor complex units, said message being conveyed over said intersystem channel means, said intersystem channel means including:
(i) intersystem channel adapter means for communicating with said processor complex communications network;
(ii) driver circuit means for interfacing said intersystem channel adapter means with said communications port of said shared electronic storage means; and
(iii) paging channel means for transferring said message between at least one of said plurality of processor complex units and said shared electronic storage device, said paging channel means including a page chain table having a plurality of entries, at least one entry of said plurality of entries including at least one message transfer instruction, said message transfer instructing including a synchronous send message instruction or an asynchronous send message instruction for specifying the transfer of said message, said paging channel means further including table execution means for executing at least one page chain table entry of said plurality of entries, said table execution means thereby reducing the performance overhead of said central processor means and said I/O processor means related to communications between said shared electronic storage means and said plurality of central processor complex units; and
(e) means in at least one of said control processor means and said I/O processor means for distinguishing specific ones of said instructions from other ones of said instructions.

2. An intersystem channel paging mechanism as set forth in claim 1 wherein said driver circuit means further comprises a plurality of electronic logic circuits and a communications link connected between at least one said logic circuit and said communications port of said shared electronic storage means.

3. An intersystem channel paging mechanism as set forth in claim 2 wherein said communications link is a fiber optic cable.

4. An intersystem channel paging mechanism as set forth in claim 1 and further including hardware sequencer means for accepting and executing said send message instruction, said sequencer means including at least one multiple state device utilizing multiple logic state control logic.

5. An intersystem channel paging mechanism as set forth in claim 1 wherein said central processor means further includes time delay means responsive to said message transfer instruction for delaying said processing of data until said transfer of said message is completed.

6. An intersystem channel paging mechanism as set forth in claim 1 wherein said central processor means further includes control transfer means for selectively transferring said execution of said instructions to said I/O processor means such that said I/O processor means executes said send message instruction.

7. An intersystem channel paging mechanism as set forth in claim 1 wherein said instruction recognition means further includes paging table generation means for generating a paging table, such that, upon recognition of said send message instruction, said paging table generation means constructs said page chain table in said hardware system area of storage.

8. An intersystem channel paging mechanism as set forth in claim 7 further including completion signal transmission means responsive to said paging table generation means for transmitting a completion signal to said paging channel means upon construction of said paging table by said paging table generation means.

9. An intersystem channel paging mechanism as set forth in claim 8 wherein said paging table is comprised of at least one page chain table entry, said paging channel means further including fetching means responsive to the receipt of said completion signal for fetching at least one said page chain table entry.

10. An intersystem channel paging mechanism as set forth in claim 9 wherein said paging table is comprised of a plurality of page chain table entries and said paging channel means further includes table execution means for sequentially executing said page chain table entries, one said page chain table entry at a time.

11. An intersystem channel paging mechanism as set forth in claim 10 wherein at least one of said central processor and said I/O processor further includes paging function execution means for executing page-in and page-out functions for implementing a paging in and a paging out, respectively, of at least one said message contained within at least one said paging table.

12. An intersystem channel paging mechanism as set forth in claim 10 wherein said table execution means further includes:
waiting period prediction means for predicting the time duration between temporally adjacent executions of said page chain table entries; and
chaining flag means for selectively implementing a disconnection function between said page chain table entries if said waiting period prediction means predicts a time duration greater than a predetermined period of time, such that said disconnection function permits the orderly sharing of said table execution means by a plurality of said page chain table entries.

13. An intersystem channel paging mechanism as set forth in claim 12 wherein said chaining flag means further includes channel path means for simultaneously accepting a plurality of said instructions.

* * * * *